United States Patent
Hahnfeld et al.

US 6,426,390 B1

(10) Patent No.: US 6,426,390 B1
(45) Date of Patent: Jul. 30, 2002

(54) HYDROGENATED BLOCK COPOLYMER COMPOSITIONS

(75) Inventors: Jerry L. Hahnfeld; Mary Ann Jones; Charles A. Berglund; Gary D. Parsons; Cora M. Leibig; Stephen F. Hahn, all of Midland, MI (US)

(73) Assignee: Dow Global Technology Inc., Mdiland, MI (US)

( * ) Notice: Subject to any disclaimer, the term of this patent is extended or adjusted under 35 U.S.C. 154(b) by 0 days.

(21) Appl. No.: 09/726,864

(22) Filed: Nov. 30, 2000

Related U.S. Application Data

(63) Continuation-in-part of application No. 09/575,062, filed on May 19, 2000, and a continuation-in-part of application No. 09/575,063, filed on May 19, 2000.
(60) Provisional application No. 60/139,075, filed on Jun. 11, 1999, provisional application No. 60/146,008, filed on Jul. 28, 1999, and provisional application No. 60/193,313, filed on Mar. 30, 2000.

(51) Int. Cl.$^7$ ................................. C08C 19/02
(52) U.S. Cl. ................... 525/314; 525/333.3; 525/338; 525/332.1
(58) Field of Search ........................ 525/88, 98, 3.3, 525/332.1, 333.3, 338, 314

(56) References Cited

U.S. PATENT DOCUMENTS

| | | |
|---|---|---|
| 3,333,024 A | 7/1967 | Haefele et al. |
| 3,431,323 A | 3/1969 | Jones |
| 3,598,886 A | 8/1971 | Hoeg et al. |
| 3,644,588 A | 2/1972 | Hassell |
| 4,123,403 A | 10/1978 | Warner et al. |
| 5,178,926 A | 1/1993 | Tanaka et al. |
| 5,189,110 A | 2/1993 | Ikematu et al. |
| 5,191,024 A | 3/1993 | Shibata et al. |
| 5,219,940 A | 6/1993 | Nakano |
| 5,306,779 A | 4/1994 | Shibata et al. |
| 5,310,817 A | 5/1994 | Hergenrother et al. |
| 5,346,964 A | 9/1994 | Shibata et al. |
| 5,352,744 A | 10/1994 | Bates et al. |
| 5,539,021 A | 7/1996 | Pate et al. |
| 5,612,422 A | 3/1997 | Hucul et al. |
| 5,688,842 A | 11/1997 | Pate, III et al. |
| 5,905,097 A | 5/1999 | Walther |

FOREIGN PATENT DOCUMENTS

| | | |
|---|---|---|
| CA | 805219 | 1/1969 |
| CA | 912188 | 10/1972 |
| CA | 2072186 | 12/1992 |
| DE | 32 27 650 | 3/1983 |
| EP | 505110 | 9/1992 |
| EP | 726291 | 8/1996 |
| JP | 3234741 | 11/1989 |
| JP | 1-318015 | 12/1989 |
| JP | 3-160051 | 7/1991 |
| JP | 3287677 | 12/1991 |
| JP | 4-75001 | 3/1992 |
| JP | 5-271482 | 10/1993 |
| JP | 2586575 | 3/1997 |
| JP | 9118812 | 5/1997 |
| JP | 2725402 | 12/1997 |
| JP | 11286526 | 10/1999 |
| WO | WO 94/15997 | 7/1994 |
| WO | WO 96/34896 | 11/1996 |
| WO | WO 98/16582 | 4/1998 |

OTHER PUBLICATIONS

Novel Heat Resistant Plastics From Hydrogenation of Styrene Polymers, J. F.; Hoeg, D. F., Goldberg, E. P., Advan. Chem. Ser. (1973), No. 129, pp. 427–431, Roy C. Ingersoll Res. Cent., Borg–Warner Corp., Des Plaines, Ill., USA.
Macromolecules, vol. 27, No. 17, pp. 4639–4647 (1994).
Physics Today, Feb. 1999, pp. 32–38.

*Primary Examiner*—Jeffrey Mullis

(57) ABSTRACT

The present invention is directed to a composition comprising a hydrogenated block copolymer of a vinyl aromatic and conjugated diene polymer, having a lamellar morphology and high aromatic hydrogenation level.

10 Claims, No Drawings

HYDROGENATED BLOCK COPOLYMER COMPOSITIONS

Cross Reference Statement

This application is a Continuation-in-Part of U.S. application Ser. No. 09/575,062, filed May 19, 2000, and U.S. application Ser. No. 09/575,063, filed May 19, 2000; which claim benefit of U.S. Provisional Application No. 60/139,075, filed on Jun. 11, 1999, U.S. Provisional Application No. 60/146,008, filed on Jul. 28, 1999 and U.S. Provisional Application No. 60/193,313, filed on Mar. 30, 2000.

The present invention is directed to a composition of a hydrogenated block copolymer of a vinyl aromatic monomer and a conjugated diene monomer.

BACKGROUND OF THE INVENTION

Various hydrogenated block copolymer compositions have been disclosed in previous applications, such as in copending applications Ser. No. 09/330,520 and Ser. No. 09/330,663, filed Jun. 11, 1999. Additionally, fabricated articles produced from such hydrogenated block copolymers have been disclosed in copending applications Ser. Nos. 09/575,063 and 09/575,062, filed May 19, 1999. However, a combination of good impact strength, processability and surface appearance is difficult to achieve in some applications of these polymers, such as in extruded sheet.

Therefore, there remains a need for hydrogenated block copolymer compositions having a superior balance of impact strength, processability and surface aesthetics which can be advantageously applied in extruded sheet applications.

SUMMARY OF THE INVENTION

It has been surprisingly discovered that an excellent balance of impact strength, processability and surface aesthetics can be obtained in a composition comprising a hydrogenated block copolymer, wherein the hydrogenated block copolymer comprises a hard segment phase volume of at least two distinct blocks of hydrogenated polymerized vinyl aromatic monomer, herein referred to as hydrogenated vinyl aromatic polymer block, and a soft segment phase volume of at least one block of hydrogenated polymerized conjugated diene monomer, herein referred to as hydrogenated conjugated diene polymer block, wherein the hydrogenated block copolymer is further characterized by:

a) a sufficient soft segment phase volume such that a lamellar morphology is achieved, b) a total number average molecular weight ($Mn_t$) of from 35,000 to 65,000; and c) a hydrogenation level such that each hydrogenated vinyl aromatic polymer block has an aromatic hydrogenation level of greater than 90 percent and each hydrogenated conjugated diene polymer block has a hydrogenation level of greater than 95 percent.

It has been surprisingly discovered that this composition offers excellent impact, processability and surface aesthetic properties and is ideal for use in extruded sheet applications.

DETAILED DESCRIPTION OF THE INVENTION

The composition of the present invention comprises a hydrogenated block copolymer of alternating blocks having at least three blocks as represented by the formula $A(BA)_n$, wherein A is a hydrogenated vinyl aromatic polymer hard block and B is a hydrogenated conjugated diene polymer soft block, wherein n is an integer from 1–3, including triblock, multi-block, tapered block, and star block copolymers, e.g. as SB'S, SB'SB'S, and the like (wherein S is hydrogenated polystyrene, B' is hydrogenated polybutadiene). The block copolymers may, however, contain any number of additional blocks, wherein these blocks may be attached at any point to the block copolymer backbone, as long as a lamellar morphology is still achieved. Thus, linear blocks would include for example ABA, ABAB, ABABA, ABABAB, and the like. The block copolymer can also be branched, wherein polymer chains are attached at any point along the block copolymer backbone. In addition, blends of any of the aforementioned block copolymers can also be used as well as blends of the block copolymers with their homopolymer counterparts as long as the required properties of the composition are met. In other words, an ABA block copolymer can be blended with a ABABA block copolymer and/or an A homopolymer, as long as lamellar morphology is still achieved.

The vinyl aromatic monomer used in preparing block copolymers, which are subsequently hydrogenated, is typically a monomer of the formula:

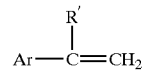

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially paravinyltoluene, all isomers of ethyl styrene, propyl styrene, butyl styrene, vinyl biphenyl, vinyl naphthalene, vinyl anthracene and the like, and mixtures thereof. The block copolymer can contain more than one specific polymerized vinyl aromatic monomer. In other words, the block copolymer can contain a polystyrene block and a poly-alpha-methylstyrene block. The hydrogenated vinyl aromatic polymer block may also be a hydrogenated copolymer of a hydrogenated vinyl aromatic, wherein the vinyl aromatic portion is at least 50 weight percent of the copolymer, as long as lamellar morphology is still achieved.

The conjugated diene monomer used in preparing block copolymers, which are subsequently hydrogenated, can be any monomer having two conjugated double bonds. Such monomers include for example 1,3-butadiene, 2-methyl-1,3-butadiene, 2-methyl-1,3 pentadiene, isoprene and similar compounds, and mixtures thereof. In one embodiment, the conjugated diene polymer block is a polybutadiene. Polybutadiene can contain either a 1,2 configuration, which hydrogenates to give the equivalent of a 1-butene repeat unit, or a 1,4-configuration, which hydrogenates to give the equivalent of an ethylene repeat unit.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. The separation of block segments can be detected by the presence of distinct glass transition temperatures. Microphase separation and block copolymers are widely discussed in "Block Copolymers-Designer Soft Materials", PHYSICS TODAY, February, 1999, pages 32–38.

Block copolymers useful in the composition of the present invention, advantageously have a specific morphology. Morphology is the mesoscopic self assembly of the blocks in the molten and solid states producing compositional patterns as described in "Block Copolymers-Designer Soft Materials" *PHYSICS TODAY,* February 1999 by Bates and Fredrickson. The specific advantageous morphology for use in the composition of the present invention is a lamellar morphology, wherein the self assembly of blocks is in discrete layers. Morphology can be determined by SAXS (small angle x-ray scattering) analysis, which is well known by those skilled in the art and described in *The Physics of Block Copolymers,* Ian W. Hamley, Chapter 5, Oxford University press, 1998, NY.

Lamellar morphology can be achieved in different ways and is dependent upon the phase volume of the soft block segment. Generally, the soft segment phase volume is of a sufficient quantity to achieve a lamellar morphology. Typically the phase volume of the soft block segment will be greater than 35, preferably greater than 37, more preferably greater than 40 and most preferably greater than 45 to 65, preferably to 60, more preferably to 55 and most preferably to 45 weight percent conjugated diene, based on the total weight of the block copolymer. The weight ratio of hydrogenated conjugated diene polymer block to hydrogenated vinyl aromatic polymer block is typically 35:65 or more, preferably greater than 40:60. The total weights of the hydrogenated vinyl aromatic polymer blocks and the hydrogenated conjugated diene polymer block(s) is typically at least 80 weight percent, preferably at least 90, and more preferably at least 95 weight percent of the total weight of the hydrogenated copolymer.

The total number average molecular weight ($Mn_t$) of the hydrogenated block copolymers useful in the present invention is typically from 35,000, preferably from 42,000, more preferably from 45,000 and most preferably from 47,000 to 80,000, typically to 70,000, and generally to 60,000. The Mn, as referred to throughout the present specification, is determined by gel permeation chromatography, compared against polystyrene standards. The molecular weight of the hydrogenated block copolymer and properties obtained are dependent upon the molecular weight of each of the hydrogenated polymeric blocks.

The $Mn_a$ of the hydrogenated vinyl aromatic polymer block will typically be from 6,000, preferably from 7,000, more preferably from 8,000 to 50,000, preferably to 40,000, more preferably to 30,000 and most preferably to 25,000. The hydrogenated conjugated diene polymer block will typically have a $Mn_b$ of from 3,000, preferably from 5,000 to 30,000, preferably to 25,000, and most preferably to 20,000.

Each individual block of the hydrogenated block copolymer can have its own distinct Mn. In other words, for example, two hydrogenated vinyl aromatic polymer blocks within the hydrogenated block copolymer may each have a different Mn.

The order-disorder temperature (ODT) of the hydrogenated block copolymer of the present invention must be below the degradation temperature of the hydrogenated block copolymer and is also determined by the Mn. This allows for ease in processing at typical extruder temperatures. Typically, the ODT is from 150° C. to 350° C., but is generally less than or equal to 350° C., preferably less than 325, more preferably less than 300, and most preferably less than 290° C.

Methods of making block copolymers are well known in the art. Typically, block copolymers are made by anionic polymerization, examples of which are cited in *Anionic Polymerization: Principles and Practical Applications,* H. L. Hsieh and R. P. Quirk, Marcel Dekker, N.Y., 1996. In one embodiment, block copolymers are made by sequential monomer addition to a carbanionic initiator such as sec-butyl lithium or n-butyl lithium. In another embodiment, the copolymer is made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154, which are herein incorporated by reference.

After preparation of the block copolymer, the copolymer is hydrogenated to remove sites of unsaturation in both the conjugated diene polymer block and the vinyl aromatic polymer block segments of the copolymer. Any method of hydrogenation can be used and such methods typically include the use of metal catalysts supported on an inorganic substrate, such as Pd on $BaSO_4$ (U.S. Pat. No. 5,352,744) and Ni on kieselguhr (U.S. Pat. No. 3,333,024) both of which are incorporated herein by reference. Additionally, soluble, homogeneous catalysts such those prepared from combinations of transition metal salts of 2-ethylhexanoic acid and alkyl lithiums can be used to fully saturate block copolymers, as described in *Die Makromolekulare Chemie,* Volume 160, pp. 291, 1972. The copolymer hydrogenation can also be achieved using hydrogen and a heterogeneous catalyst such as those described in U.S. Pat. Nos. 5,352,744, 5,612,422 and 5,645,253 which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that is contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof Other heterogeneous catalysts can also be used, having average pore diameters in the range of 500 to 3,000 angstroms.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component in the mixed catalyst is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The mixed catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram (m2/g) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter of the support for the mixed catalyst is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4,000 angstroms. For lower molecular weight polymers (Mn<100,000 for example), the typical desired surface area can vary from 45 to 85 $m^2/g$ and the desired average pore diameter from 300 to 700 angstroms.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica,* John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica,* John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis,* "Successful Design of Catalysts" V. 44, pg. 146–158, 1989 and *Applied Heterogeneous Catalysis* pgs. 75–123, Institute Francais du Petrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the mixed supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

The amount of mixed supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.1 gram being preferred and less than 0.05 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 5,000 parts unsaturated polymer. Higher temperatures and pressures will also enable using smaller amounts of supported catalyst. Alternatively, continuous processes can also be used using fixed bed catalysts of the above.

The hydrogenating agent can be any hydrogen producing compound which will efficiently hydrogenate the unsaturated polymer. Hydrogenating agents include, but are not limited, to hydrogen gas, hydrazine and sodium borohydride. In a preferred embodiment, the hydrogenating agent is hydrogen gas.

The level of hydrogenation of the block copolymer is generally greater than 95 percent of the conjugated diene polymer block and greater than 90 percent of the vinyl aromatic polymer block segments, typically greater than 99 percent of the conjugated diene polymer block and greater than 95 percent of the vinyl aromatic polymer block segments, preferably greater than 99.5 percent of the conjugated diene polymer block and greater than 97 percent of the vinyl aromatic polymer block segments, more preferably greater than 99.9 percent of the conjugated diene polymer block and 98.5 percent of the vinyl aromatic polymer block segments, even more preferably greater than 99 percent of the vinyl aromatic polymer segments. The term 'level of hydrogenation' refers to the percentage of the original unsaturated bonds which become saturated upon hydrogenation. The level of hydrogenation for the hydrogenated vinyl aromatic polymer block is determined by UV-VIS spectrophotometry, while the level of hydrogenation of the hydrogenated conjugated diene polymer block is determined by proton NMR.

The following examples are set forth to illustrate the present invention and should not be construed to limit its scope. In the examples, all parts and percentages are by weight unless otherwise indicated.

The amount of aromatic hydrogenation is measured using UV-VIS spectroscopy as described previously.

Mn is an absolute molecular weight measured by gel permeation chromatography, unless otherwise specified.

All polymer samples used in the examples have atactic stereostructure.

EXAMPLES

Preparation of Pt/Re Catalyst

A solution of 0.411 grams (g) $H_2PtCl_6 \cdot 6(H_2O)$ and 0.147 g of $NH_4ReO_4$ is dissolved in 15.55 grams of purified water. This solution is then added to 5.0 g of silica which is then air dried overnight, and further dried at 110° C. in an air purged oven for 30 minutes. The catalyst is reduced in flowing hydrogen at 150° C. for 1 hour to yield a catalyst having 3 weight percent Pt and 2 weight. percent Re on $SiO_2$.

Hydrogenation of Styrene-Butadiene Block Copolymer 1.0 g of the reduced Pt/Re catalyst described above is added to 240 g of a 15 wt. percent solution of a styrene(S)-butadiene(B) block copolymer as described in Table 1, in cyclohexane, in a stirred autoclave style reactor. The reactor is sealed and the vapor space purged with nitrogen and filled with pure hydrogen. The temperature is then raised to about 150° C. and the reactor is pressurized with hydrogen to 10.3 MPa. Analysis of the polymer shows greater than 98% hydrogenation of the aromatic region.

Sheet Examples

The polymer is then extruded into sheet using the following extrusion conditions:

Example Extrusion

Conditions

| Barrel Temperatures | ° C. | Gear Pump RPM | 37 |
|---|---|---|---|
| Zone 1 | 221 | Extruder RPM | 29 |
| Zone 2 | 232 | Die Pressure | 11.2 MPa |
| Zone 3 | 271 | Suction Pressure | 3.4 MPa |
| Clamp Ring | 271 | Discharge Pressure | 1.4 MPa |
| Adapter | 282 | | |
| Die | 288 | | |
| Roll Stack | | | |
| Top | 165 | | |
| Middle | 175 | | |
| Bottom | 180 | | |

TABLE 1

| Ex. | polymer | ODT (° C.) | Morphology | Mn | Wt. % HPB | % 1, 2 | % Hydrog. | Instrumented Dart[1] Total Energy (Joules) (Extruded Sheet at 23° C.) | Sheet Surface[2] Appearance (Melt Temp. of 300° C. |
|---|---|---|---|---|---|---|---|---|---|
| Linear Triblock | | | | | | | | | |
| * | SBS | >320 | Cylindrical | 80,000 | 25% | 10% | 95% | <6.8 | Poor |
| | SBS | 193 | Lamellar | 40,000 | 50% | 40% | 100% | 441 | Good |
| Linear Pentablock | | | | | | | | | |
| * | SBSBS | 258 | Cylindrical | 75,000 | 20% | 10% | 100% | 6.8 | Good |
| | SBSBS | 257 | Lamellar | 60,000 | 45% | 10% | 100% | 386 | Good |

S = hydrogenated polystyrene block
B = hydrogenated polybutadiene block
HPB = hydrogenated polybutadiene
ODT is the order-disorder temperature
% 1,2 is the percentage of 1, 2 content in the butadiene polymer prior to hydrogenation.
*Comparative Examples
[1]ASTM method D3763-85, run at 8000 in/min (203 m/min.), ½ inch (1.27 cm) dart, 1½ inch (3.81 cm)support.
[2]Sheet surface is either smooth and glossy (Good) or the surface is roughened and the sheet opaque (Poor).

Extruded Sheet ranges in thickness between 0.065 inches (0.165 cm) and 0.080 inches (0.2 cm.). In the triblock and pentablock copolymers, all hydrogenated polystyrene blocks have equivalent Mn.

What is claimed is:

1. A composition comprising a hydrogenated block copolymer of alternating blocks, wherein the hydrogenated block copolymer comprises a hard segment phase volume of at least two distinct blocks of hydrogenated polymerized vinyl aromatic monomer, herein referred to as hydrogenated vinyl aromatic polymer block, and a soft segment phase volume of at least one block of hydrogenated polymerized conjugated diene monomer, herein referred to as hydrogenated conjugated diene polymer block, wherein the hydrogenated block copolymer is further characterized by:
   a) a sufficient soft segment phase volume such that a lamellar morphology is achieved,
   b) a total number average molecular weight ($Mn_t$) of from 35,000 to 65,000; and
   c) a hydrogenation level such that each hydrogenated vinyl aromatic polymer block has a hydrogenation level of greater than 90 percent and each hydrogenated conjugated diene polymer block has a hydrogenation level of greater than 95 percent.

2. The composition of claim 1, wherein the vinyl aromatic monomer comprises styrene and the conjugated diene monomer comprises butadiene.

3. The composition of claim 2, wherein the soft segment phase volume is from 35 to 65 wt. percent, based on the total weight of the block copolymer.

4. The composition of claim 3, wherein the soft segment phase volume is greater than 40 wt percent to 65 wt. percent, based on the total weight of the block copolymer.

5. The composition of claim 2, wherein the block copolymer is a pentablock copolymer.

6. The composition of claim 2, wherein the block copolymer is a triblock copolymer.

7. The composition of claim 1, wherein the block copolymer has an order to disorder transition temperature of from 150 to 350° C.

8. A fabricated article produced from the composition of claim 1.

9. The fabricated article of claim 8, wherein the article is an extruded sheet.

10. The extruded sheet of claim 9, wherein the sheet is formed into a thermoformed article.

* * * * *